(12) United States Patent
Katano

(10) Patent No.: US 8,986,901 B2
(45) Date of Patent: Mar. 24, 2015

(54) FUEL CELL SYSTEM

(75) Inventor: Koji Katano, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 13/577,594

(22) PCT Filed: Feb. 26, 2010

(86) PCT No.: PCT/JP2010/001315
§ 371 (c)(1),
(2), (4) Date: Aug. 7, 2012

(87) PCT Pub. No.: WO2011/104762
PCT Pub. Date: Sep. 1, 2011

(65) Prior Publication Data
US 2012/0308908 A1 Dec. 6, 2012

(51) Int. Cl.
*H01M 8/04* (2006.01)
(52) U.S. Cl.
CPC ................ *H01M 8/04* (2013.01); *Y02E 60/521* (2013.01); *Y02E 60/50* (2013.01)
USPC ........... 429/446; 429/443; 429/444; 429/428; 429/429
(58) Field of Classification Search
USPC .......................................... 429/429, 444, 446
See application file for complete search history.

(56) References Cited

U.S. PATENT DOCUMENTS

| | | | | |
|---|---|---|---|---|
| 7,135,246 | B2 * | 11/2006 | Motoyama et al. | ........... 429/434 |
| 7,144,650 | B2 * | 12/2006 | Fukuma et al. | ............... 429/443 |
| 2010/0047646 | A1 | 2/2010 | Kitamura | |

FOREIGN PATENT DOCUMENTS

| | | | | | |
|---|---|---|---|---|---|
| JP | 07-105963 | * | 4/1995 | ............. | H01M 8/04 |
| JP | 09-223511 | * | 8/1997 | ............. | H01M 8/04 |
| JP | 9-223511 | A | 8/1997 | | |
| JP | 2004-129433 | * | 4/2004 | ............. | H01M 8/04 |
| JP | 2004-129433 | A | 4/2004 | | |
| JP | 2006-073376 | A | 3/2006 | | |
| JP | 2008-004564 | A | 1/2008 | | |
| JP | 2008-010198 | * | 1/2008 | ............. | H01M 8/04 |
| JP | 2008-010198 | A | 1/2008 | | |
| JP | 2008-041622 | A | 2/2008 | | |

(Continued)

OTHER PUBLICATIONS

International Search Report issued May 25, 2010 in PCT/JP2010/001315.

*Primary Examiner* — Ula C. Ruddock
*Assistant Examiner* — Osei Amponsah
(74) *Attorney, Agent, or Firm* — Kenyon & Kenyon LLP

(57) ABSTRACT

A fuel cell system includes an air supply flow path configured to supply the air to a fuel cell, a reed valve provided in the air supply flow path, an air exhaust flow path configured to allow the air discharged from the fuel cell to flow therethrough, a pressure regulating valve provided in the air exhaust flow path and configured to adjust back pressure of the air supplied to the fuel cell, a bypass flow path configured to connect an upstream section of the air supply flow path upstream of the reed valve with the air exhaust flow path, and a bypass valve provided in the bypass flow path and configured to open and close the bypass flow path. The fuel cell system reduces the opening of the pressure regulating valve with supplying the air to the fuel cell in the closed position of the bypass valve, so as to increase the pressure of the air upstream of the pressure regulating valve, and subsequently opens the bypass valve.

6 Claims, 7 Drawing Sheets

(56) References Cited

FOREIGN PATENT DOCUMENTS

| JP | 2008-243762 A | 10/2008 |
| JP | 2009-087862 | * 4/2009 | ............ H01M 8/04 |
| JP | 2009-087862 A | 4/2009 |
| WO | 2008007689 A1 | 1/2008 |

* cited by examiner

FUEL CELL SYSTEM

This is a 371 national phase application of PCT/JP2010/001315 filed 26 Feb. 2010, the contents of which are incorporated herein by reference.

TECHNICAL FIELD

The present invention relates to a technique of controlling a valve provided in the flow path configured to supply the air to a fuel cell.

BACKGROUND ART

A fuel cell system generally has a problem that the inflow of the air to the cathodes of a fuel cell may disadvantageously lead to oxidation and resulting degradation of a catalyst. In order to address this problem, for example, one proposed technique disclosed in PTL1 closes an air inlet shutoff valve and an air outlet shutoff valve at a stoppage of the system, so as to prevent the inflow of the air into the fuel cell during the stoppage of the system.

In the fuel cell system of this proposed configuration, after the air inlet shutoff valve and the air outlet shutoff valve are closed at a stoppage of the system, the pressure at the cathodes may decrease to a negative pressure level by the reaction of remaining oxygen and hydrogen in the fuel cell. A valve configured to keep the closed position irrespective of whether the pressure at the cathodes is a positive pressure level or a negative pressure level during the stoppage of the system should thus be employed as the shutoff valve to shut off the flow of the air. The configuration disclosed in PTL1 thus employs a valve of relatively complicated structure with a diaphragm and a plurality of flow inlets and flow outlets, as the shutoff valve. The shutoff valve of such complicated structure may be, however, a factor that interferes with size reduction and cost reduction of the fuel cell system.

CITATION LIST

Patent Literatures

PTL 1: JP 2008-243762A
PTL 2: JP 2008-010198A

SUMMARY OF INVENTION

Technical Problem

By taking into account the foregoing, the problem to be addressed by the invention is to provide a technique of preventing the inflow of the air into a fuel cell during the stoppage of a fuel cell system by employing a low-cost valve.

Solution to Problem

In order to achieve at least part of the foregoing, the present invention provides various aspects or application examples described below.

APPLICATION EXAMPLE 1

A fuel cell system comprising a fuel cell; an air supply flow path configured to supply the air to the fuel cell; a reed valve provided in the air supply flow path and configured to be opened by a flow of the air toward the fuel cell; an air exhaust flow path configured to allow the air discharged from the fuel cell to flow therethrough; a pressure regulating valve provided in the air exhaust flow path and configured to adjust back pressure of the air supplied to the fuel cell; a bypass flow path configured to connect an upstream section of the air supply flow path upstream of the reed valve with the air exhaust flow path; a bypass valve provided in the bypass flow path and configured to open and close the bypass flow path; and a controller configured to sequentially perform a pressure-increasing process and a valve-closing process at a stoppage of the fuel cell system, wherein the pressure-increasing process reduces opening of the pressure regulating valve with supplying the air through the air supply flow path to the fuel cell in a closed position of the bypass valve, so as to increase pressure of the air upstream of the pressure regulating valve, and the valve-closing process opens the bypass valve to allow a reverse flow of the air in the vicinity of the reed valve, so as to close the reed valve.

At a stoppage of the fuel cell system, the fuel cell system of this configuration reduces the opening of the pressure regulating valve with supplying the air to the fuel cell in the closed position of the bypass valve, so as to increase the pressure of the air upstream of the pressure regulating valve. The fuel cell system subsequently opens the bypass valve to allow a reverse flow of the air in the vicinity of the reed valve and thus effectively closes the reed valve. This effectively prevents the inflow of the air into the fuel cell during the stoppage of the fuel cell system by employing the low-cost reed valve.

APPLICATION EXAMPLE 2

With the fuel cell system as noted in Application Example 1, the fuel cell system further comprises a hydrogen pressure regulator configured to regulate pressure of hydrogen supplied to the fuel cell, the controller controls the hydrogen pressure regulator to increase the pressure of hydrogen supplied to the fuel cell, in synchronism with the increase in pressure of the air during the pressure-increasing process. This configuration reduces the differential pressure between the electrodes in the fuel cell and thereby prevents a physical load from being applied to the electrolyte membranes and its peripheral components.

APPLICATION EXAMPLE 3

With the fuel cell system as noted in Application Example 1 or 2, the controller decreases a flow rate of the air supplied to the fuel cell during the pressure-increasing process to be lower than a flow rate of the air supplied during operation of the fuel cell system. This configuration effectively prevents an abrupt increase in pressure of the air in the fuel cell during the pressure-increasing process.

APPLICATION EXAMPLE 4

With the fuel cell system as noted in any one of Application Examples 1 through 3, at a joint between the air supply flow path and the bypass flow path, a flow path cross sectional area of the bypass flow path is greater than a flow path cross sectional area of the air supply flow path. This configuration facilitates the flow of the air from the fuel cell toward the bypass flow path when the bypass valve is opened. This accordingly enables the reed valve to be closed more effectively.

APPLICATION EXAMPLE 5

With the fuel cell system as noted in any one of Application Examples 1 through 4, a joint between the air supply flow path and the bypass flow path is located proximate to the reed valve. This configuration also facilitates the flow of the air from the fuel cell toward the bypass flow path when the bypass valve is opened. This accordingly enables the reed valve to be closed more effectively.

APPLICATION EXAMPLE 6

With the fuel cell system as noted in any one of Application Examples 1 through 5, an inlet of the bypass flow path and an inlet of the reed valve are located to substantially face each other. This configuration similarly facilitates the flow of the air from the fuel cell toward the bypass flow path when the bypass valve is opened. This accordingly enables the reed valve to be closed more effectively.

APPLICATION EXAMPLE 7

With the fuel cell system as noted in any one of Application Examples 1 through 6, the fuel cell system further comprises a buffer tank located between the reed valve and the fuel cell and configured to have a greater flow path cross sectional area than that of the air supply flow path. This configuration makes the pressure on the fuel cell side less likely to decrease when the bypass valve is opened. This accordingly enables the reed valve to be closed more effectively.

APPLICATION EXAMPLE 8

A fuel cell system comprising a fuel cell; an air compressor configured to pressurize the air; an air supply flow path configured to supply the air from the air compressor to the fuel cell; a reed valve provided in the air supply flow path and configured to be opened by a flow of the air toward the fuel cell; an air exhaust flow path configured to allow the air discharged from the fuel cell to flow therethrough; a pressure regulating valve provided in the air exhaust flow path and configured to adjust back pressure of the air supplied to the fuel cell; and a controller configured to sequentially perform a pressure-increasing process and a valve-closing process at a stoppage of the fuel cell system, wherein the pressure-increasing process reduces opening of the pressure regulating valve with supplying the air through the air supply flow path to the fuel cell in a closed position of the bypass valve, so as to increase pressure of the air upstream of the pressure regulating valve, and the valve-closing process closes the pressure regulating valve and stops the air compressor, so as to close the reed valve.

At a stoppage of the fuel cell system, the fuel cell system of this aspect reduces the opening of the pressure regulating valve with supplying the air to the fuel cell, so as to increase the pressure of the air upstream of the pressure regulating valve. The fuel cell system subsequently closes the pressure regulating valve and stops the air compressor to allow a reverse flow of the air in the vicinity of the reed valve. This configuration also effectively prevents the inflow of the air into the fuel cell during the stoppage of the fuel cell system by employing the low-cost reed valve.

APPLICATION EXAMPLE 9

With the fuel cell system as noted in Application Example 8, during the valve-closing process, the controller closes the pressure regulating valve when a rotating speed of the air compressor or an amount of supply of the air by the air compressor decreases to or below a preset level. This configuration effectively prevents an abrupt increase in pressure of the air in the fuel cell during the pressure-increasing process.

The present invention is not limited to the configuration of the fuel cell system described above, but may be actualized by, for example, a control method of the fuel cell system, a control program and a vehicle equipped with the fuel cell system.

DESCRIPTION OF EMBODIMENTS

Embodiments of the invention are described below.

A. First Embodiment

Figure 1:
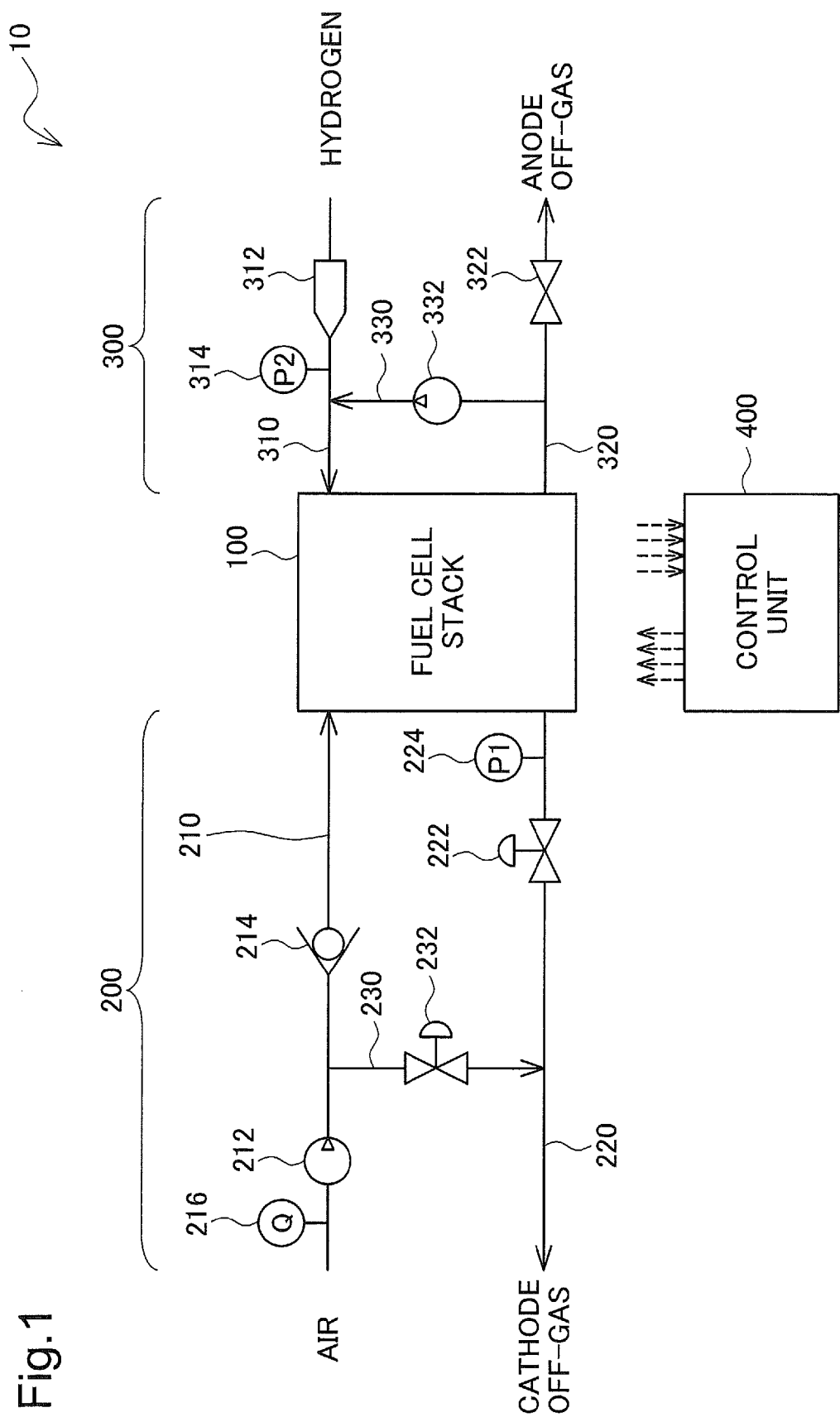
FIG. 1 is a diagram illustrating the general configuration of a fuel cell system according to a first embodiment.

FIG. 1 is a diagram illustrating the general configuration of a fuel cell system 10 according to a first embodiment of the invention. The fuel cell system 10 of the embodiment includes a fuel cell stack 100, an air supply system 200 configured to supply the air as an oxidizing gas to the fuel cell stack 100, a hydrogen supply system 300 configured to supply hydrogen as a fuel gas to the fuel cell stack 100, and a control unit 400 configured to control the operations of the fuel cell system 10. The fuel cell system 10 of the embodiment may be mounted as power source on a moving body, such as a vehicle driven with a drive motor.

The fuel cell stack 100 is constructed as a polymer electrolyte fuel cell having a stacked structure provided by stacking a plurality of unit cells. Each unit cell has a hydrogen electrode (hereinafter referred to as anode) and an oxygen electrode (hereinafter referred to as cathode), which respectively contain, for example, platinum catalyst and are placed across an electrolyte membrane. Supplying hydrogen to the anodes of the respective unit cells and the oxygen-containing air to the cathodes of the respective unit cells causes the electrochemical reaction to proceed and generate electromotive force. The type of the fuel cell is not limited to the polymer electrolyte fuel cell but may be any of various other types of fuel cells, e.g., phosphoric acid fuel cell.

The air supply system 200 includes an air supply flow path 210 configured to supply the air introduced from outside of the fuel cell system 10 to the cathodes in the fuel cell stack 100, and an air exhaust flow path 220 configured to discharge the air from the fuel cell stack 100 (cathode off-gas) to outside.

An air compressor 212 for pressurizing the externally introduced air and a reed valve 214 are provided in the air supply flow path 210. The air pressurized by the air compressor 212 passes through the reed valve 214 and is supplied to the fuel cell stack 100. The reed valve 214 is configured to be opened by the flow of the air from the air compressor 212 toward the fuel cell stack 100 and to be closed by the reverse flow. An air flow meter 216 is located upstream of the air compressor 212 to measure the flow rate of the air supplied to the fuel cell stack 100.

A pressure regulating valve 222 is provided in the air exhaust flow path 220 to adjust the back pressure of the air supplied to the fuel cell stack 100. An air pressure sensor 224 for measuring the air pressure is located upstream of the pressure regulating valve 222. The downstream section of the air exhaust flow path 220 downstream of the pressure regulating valve 222 is connected with the location between the air compressor 212 and the reed valve 214 in the air supply flow path 210 by a bypass flow path 230. A bypass valve 232 is provided in the bypass flow path 230 to shut off the air flowing in the bypass flow path 230 from the air supply flow path 210 toward the air exhaust flow path 220.

The hydrogen supply system 300 includes a hydrogen supply flow path 310 configured to receive hydrogen supplied from, e.g., a hydrogen tank and allow the supplied hydrogen to be flowed to the fuel cell stack 100, and a hydrogen exhaust flow path 320 configured to discharge hydrogen from the fuel cell stack 100 (anode off-gas) to outside.

An injector 312 serving as a pressure regulator to regulate the pressure of hydrogen supplied to the fuel cell system 10 is provided in the hydrogen supply flow path 310. A hydrogen pressure sensor 314 is located downstream of the injector 312 to measure the pressure of hydrogen regulated by the injector 312.

A purge valve 322 is provided in the hydrogen exhaust flow path 320 to discharge the anode off-gas to outside. The upstream section of the hydrogen exhaust flow path 320 upstream of the purge valve 322 is connected with the downstream section of the hydrogen supply flow path 310 downstream of the injector 312 by a circulation flow path 330. A circulation pump 332 is provided in the circulation flow path 330 to circulate the anode off-gas from the hydrogen exhaust flow path 320 to the hydrogen supply flow path 310.

The purge valve 322 is normally closed during operation of the fuel cell system 10. The remaining hydrogen-containing anode off-gas from the fuel cell system 10 accordingly flows through the hydrogen exhaust flow path 320 and the circulation flow path 330, is pressurized by the circulation pump 332, is introduced into the hydrogen supply flow path 310 and is resupplied to the fuel cell stack 100. During operation of the fuel cell system 10, the impurities, such as nitrogen and water vapor, are transmitted from the cathodes to the anodes in the fuel cell stack 100. The control unit 400 opens the purge valve 322 at specific timings to adequately discharge the impurities with the anode off-gas to outside.

The control unit 400 is a device for controlling the operations of the fuel cell system 10 and is connected with the various sensors (i.e., air flow meter 216, air pressure sensor 224 and hydrogen pressure sensor 314) and the various actuators (air compressor 212, pressure regulating valve 222, bypass valve 232, injector 312, circulation pump 332 and purge valve 322) described above. The control unit 400 includes a CPU and a memory and performs an air shutoff process described below during the stoppage of the fuel cell system 10, according to a specified control program stored in the memory.

Figure 2:
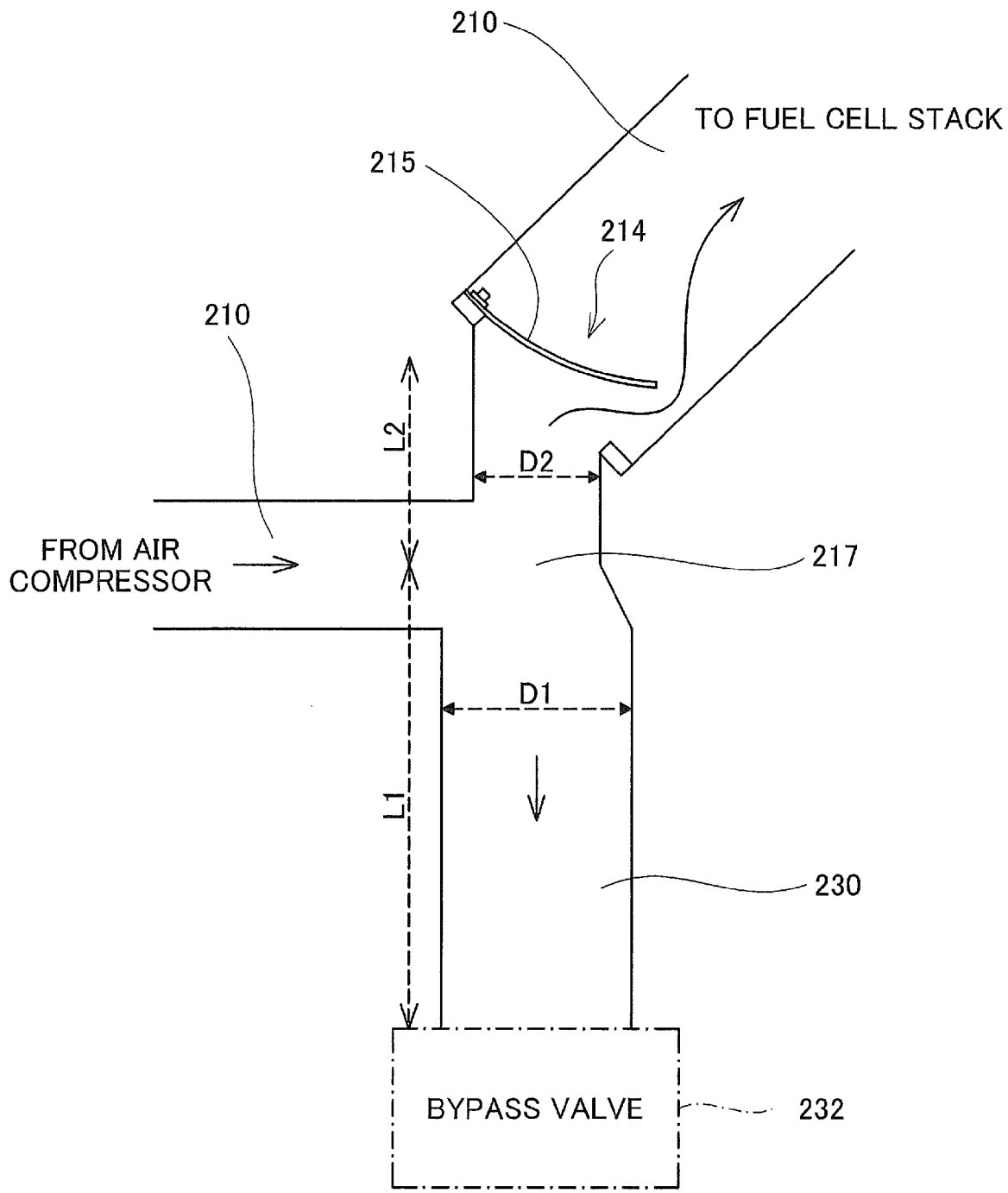
FIG. 2 is a diagram illustrating the general structure in the periphery of a reed valve.

FIG. 2 is a diagram illustrating the general structure in the periphery of the reed valve 214. As shown in FIG. 2, the reed valve 214 has a plate-like valve body 215 with one end fixed and the other end deflected relative to the fixed end as the support in response to the pressure difference between inside and outside of the valve. The reed valve 214 is configured to be autonomously opened by the pressure of the air flowing from the air compressor 212 toward the fuel cell system 10 and to be autonomously closed by the pressure of the reverse flow of the air flowing in the opposite direction (i.e., direction from the fuel cell stack 100 toward the air compressor 212). The air supply flow path 210 is formed to be bent inward in the angle of 45 degrees or less about the outside fixed end of the reed valve 214. Bending the air supply flow path 210 in this way effectively prevents the pressure loss from increasing when the air flows through the reed valve 214.

According to the embodiment, a joint 217 of the air supply flow path 210 and the bypass flow path 230 is placed in proximity to the reed valve 214. Additionally, the inlet of the reed valve 214 and the inlet of the bypass flow path 230 are arranged, such that these inlet planes face each other in the angle of 45 degrees or less. The bypass flow path 230 has a diameter D1, which is greater than a diameter D2 of the air supply flow path 210 at the inlet of the reed valve 214. A distance L1 from the joint 217 to the bypass valve 232 is made greater than a distance L2 from the joint 217 to the reed valve 214. According to this embodiment, the inner volume of the flow path from the joint 217 to the bypass valve 232 is thus made greater than the inner volume of the flow path from the joint 217 to the reed valve 214. The diameter D1, the diameter D2, the distance L1 and the distance L2 may be set respectively to, for example, 58 mm, 45 mm, 70 mm and 28 mm.

Figure 3:
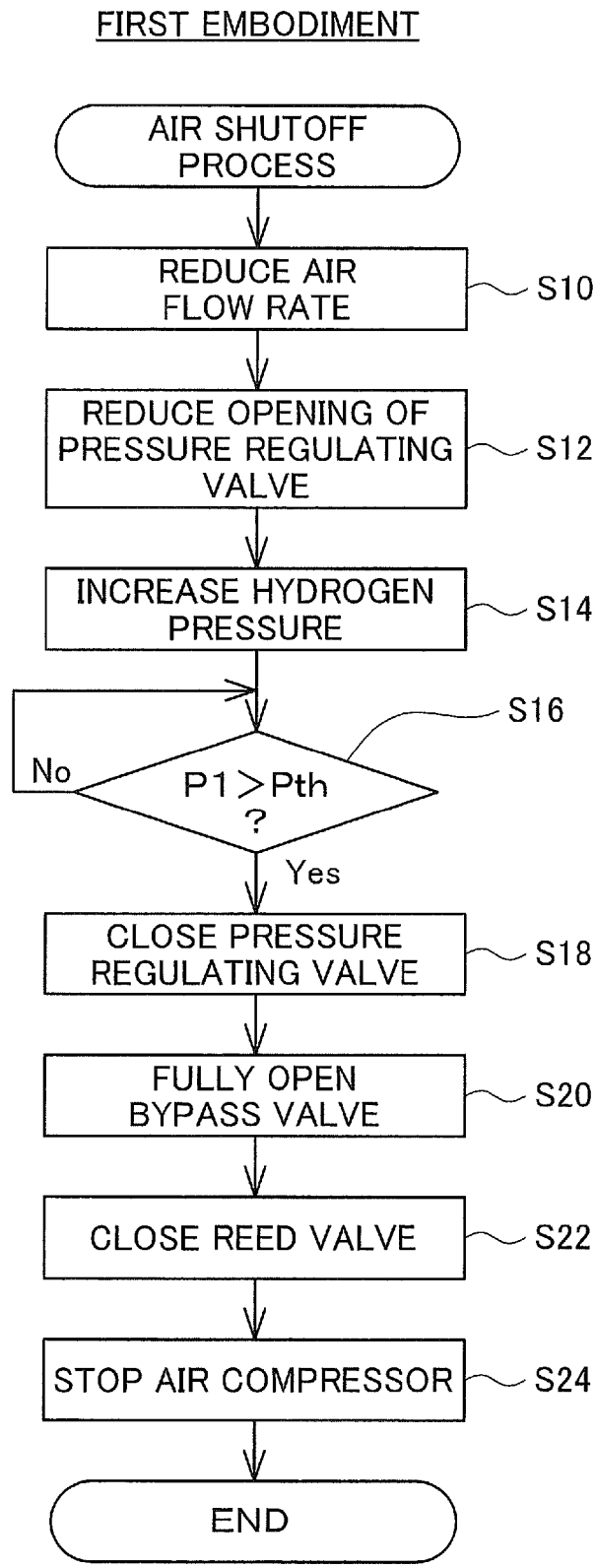
FIG. 3 is a flowchart showing an air shutoff process.
Figure 4:
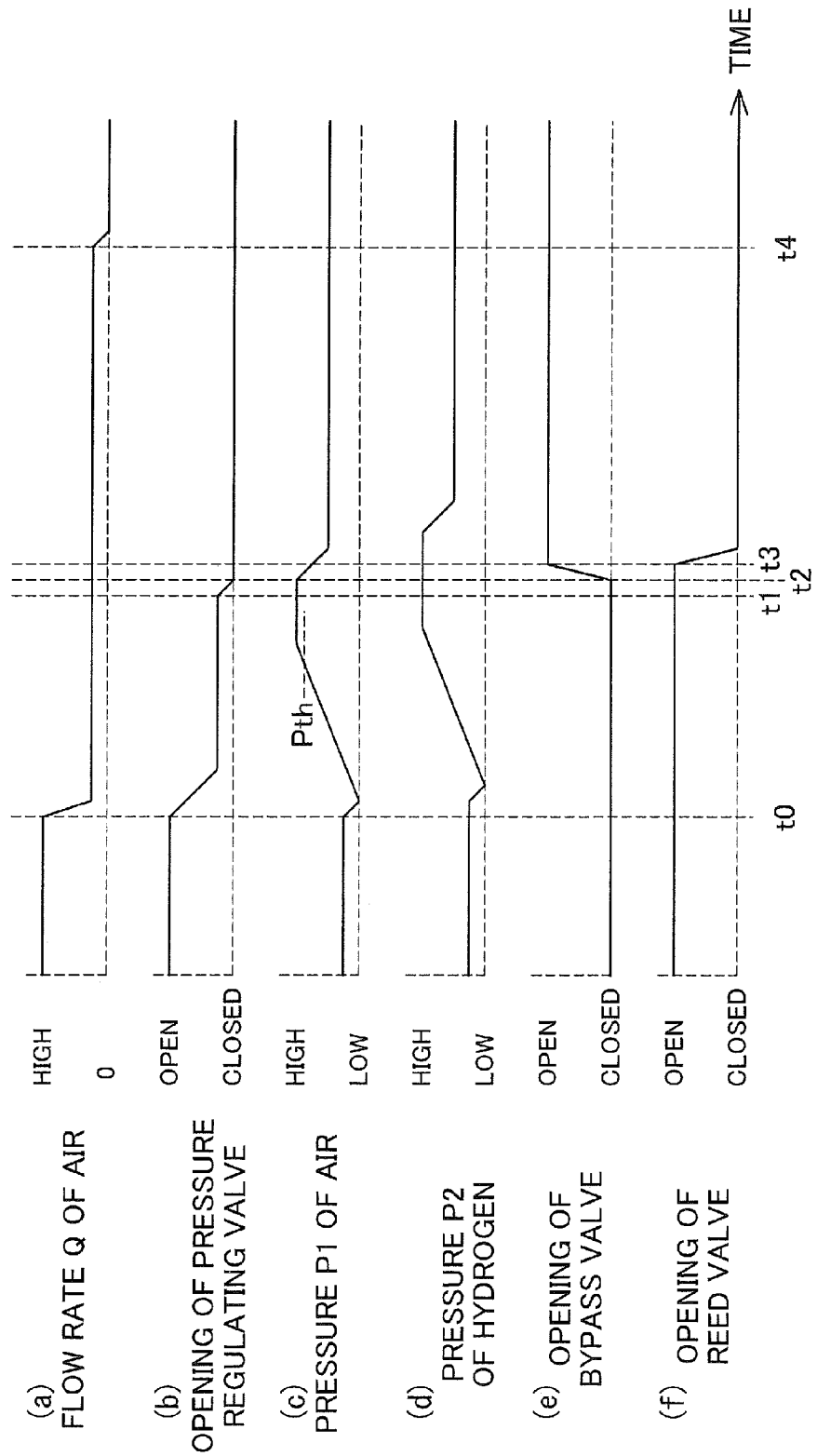
FIG. 4 is a timing chart showing the operation timings of the respective components in the air shutoff process.

FIG. 3 is a flowchart showing an air shutoff process performed by the control unit 400 during the stoppage of the fuel cell system 10. This process is described below with reference to the timing chart shown in FIG. 4. On the start of the air shutoff process, the bypass valve 232 is in a closed position.

When a stop command is given to the fuel cell system 10, for example, by operation of an ignition switch, the control unit 400 controls the air compressor 212 with monitoring the flow rate Q of the air by the air flow meter 216, so as to reduce the flow rate Q of the air, which is to be supplied to the fuel cell system 10, to an approximately minimum flow rate (step S10) at a timing t0 of FIG. 4(a). The control unit 400 also reduces the opening of the pressure regulating valve 222 (step S12). At this time, the control unit 400 sets the opening of the pressure regulating valve 222 so as to make the flow rate of the air flowing out of the pressure regulating valve 222 less than the flow rate Q set at step S10. Reducing the flow rate Q of the air and reducing the opening of the pressure regulating valve 222 in this way gradually increase the pressure P1 of the air after the timing t0 as shown in FIG. 4(c).

The control unit 400 subsequently monitors the pressure P1 of the air by the air pressure sensor 224 and controls the injector 312 to increase the pressure P2 of hydrogen in the hydrogen supply system 300 with an increase in pressure P1 (step S14) as shown in FIG. 4(d). Increasing the pressure P2 of hydrogen in the hydrogen supply system 300 with an increase in pressure P1 of the air in this way reduces the differential pressure between the electrodes in the fuel cell stack 100, so as to prevent a physical load from being applied to, for example, the electrolyte membranes. The pressure P1 of the air temporarily decreases immediately after the timing t0 as shown in FIG. 4(c). This is ascribed to a temporary decrease in pressure of the air supply system 200 accompanied by the reduction of the flow rate Q of the air at step S10. The pressure P2 of hydrogen decreases with the pressure P1 of the air as shown in FIG. 4(d). This is because the control unit 400 regulates the pressure P2 of hydrogen synchronously with a variation in pressure P1 of the air.

While gradually increasing the pressure P1 of the air as described above, the control unit 400 determines whether the increasing pressure P1 of the air exceeds a predetermined threshold value Pth (step S16). When the pressure P1 does not exceed the threshold value Pth, the control unit 400 waits until the pressure P1 exceeds the threshold value Pth. When the pressure P1 exceeds the threshold value Pth, the control unit 400 closes the pressure regulating valve 222 (step S18) at a timing t1 of FIG. 4(b) and shortly afterwards fully opens the bypass valve 232 (step S20) at a timing t2 of FIG. 4(e). The air upstream of the pressure regulating valve 222 then flows into the bypass flow path 230. This reverse flow of the air in the opposite direction closes the reed valve 214 (step S22). Closing the reed valve 214 decreases the pressure P1 of the air in the air supply system 200, so that the control unit 400 also decreases the pressure P2 of hydrogen corresponding to the decrease of the pressure P1. The threshold value Pth to be compared with the pressure P1 of the air at step S16 may be determined by experimentally measuring the air pressure that can fully close the reed valve 214.

After closing the reed valve 214, the control unit 400 lastly stops the air compressor 212 (step S24) at a timing t4 of FIG. 4(a) and terminates the air shutoff process. At this time, the control unit 400 also closes the injector 312 and the purge valve 322 in the hydrogen supply system 300.

The fuel cell system 10 of the embodiment described above closes the reed valve 214 and the pressure regulating valve 222 after the stoppage of the fuel cell system 10, so as to prevent the air from flowing into the fuel cell stack 100. This results in preventing the catalyst from being oxidized and degraded during the stoppage of the fuel cell system 10. Additionally, the configuration of the embodiment performs the air shutoff process described above to ensure the positive pressure at the cathodes in the fuel cell stack 100 during the stoppage of the fuel cell system 10. This effectively shuts off the inflow of the air by using the reed valve 214 of the simple structure, thus enabling size reduction and cost reduction of the fuel cell system 10.

After the stoppage of the fuel cell system 10, the configuration of the embodiment increases the pressure of hydrogen at the anodes, as well as the pressure of the air at the cathodes in the fuel cell stack 100. This prevents a differential pressure from being generated between the electrodes in the fuel cell stack 100, thus preventing a physical load from being applied to, e.g., the electrolyte membranes in the fuel cell stack 100 during the stoppage of the fuel cell system 10. Increasing the pressure of hydrogen at the anodes facilitates transmission of hydrogen from the anodes to the cathodes and the resulting reaction of hydrogen with oxygen at the cathodes and thereby enables the remaining oxygen at the cathodes to be consumed during the stoppage of the fuel cell system 10. This more effectively prevents oxidation of the catalyst.

In the course of closing the reed valve 214, the configuration of the embodiment reduces the opening of the pressure regulating valve 222 and reduces the flow rate Q of the air, so as to gradually increase the pressure of the air in the fuel cell stack 100. This restricts an abrupt increase in pressure of the air and thereby prevents a physical load from being applied to the electrolyte membranes and the reed valve 214. Gradually increasing the pressure of the air in the fuel cell stack 100 in this way facilitates the pressure regulation of hydrogen at the anodes, thus more effectively preventing an increase in differential pressure between the electrodes.

According to this embodiment, the inlet of the reed valve 214 in the air supply flow path 210 and the inlet of the bypass flow path 230 are located to substantially face each other and in proximity to each other. The diameter D1 at the inlet of the bypass flow path 230 is made greater than the diameter D2 of the air supply flow path 210 upstream of the reed valve 214. Additionally, the distance L1 from the joint 217 between the air supply flow path 210 and the bypass flow path 230 to the bypass valve 232 is made greater than the distance L2 from the joint 217 to the reed valve 214. The inner volume of the flow path from the joint 217 to the bypass valve 232 is accordingly made greater than the inner volume of the flow path from the joint 217 to the reed valve 214. Such configuration of the embodiment facilitates the flow of the air from the fuel cell stack 100 toward the bypass flow path 230 when the bypass valve 232 is opened. This enables the reed valve 214 to be closed more effectively when the bypass valve 232 is opened.

B. Second Embodiment

Figure 5:
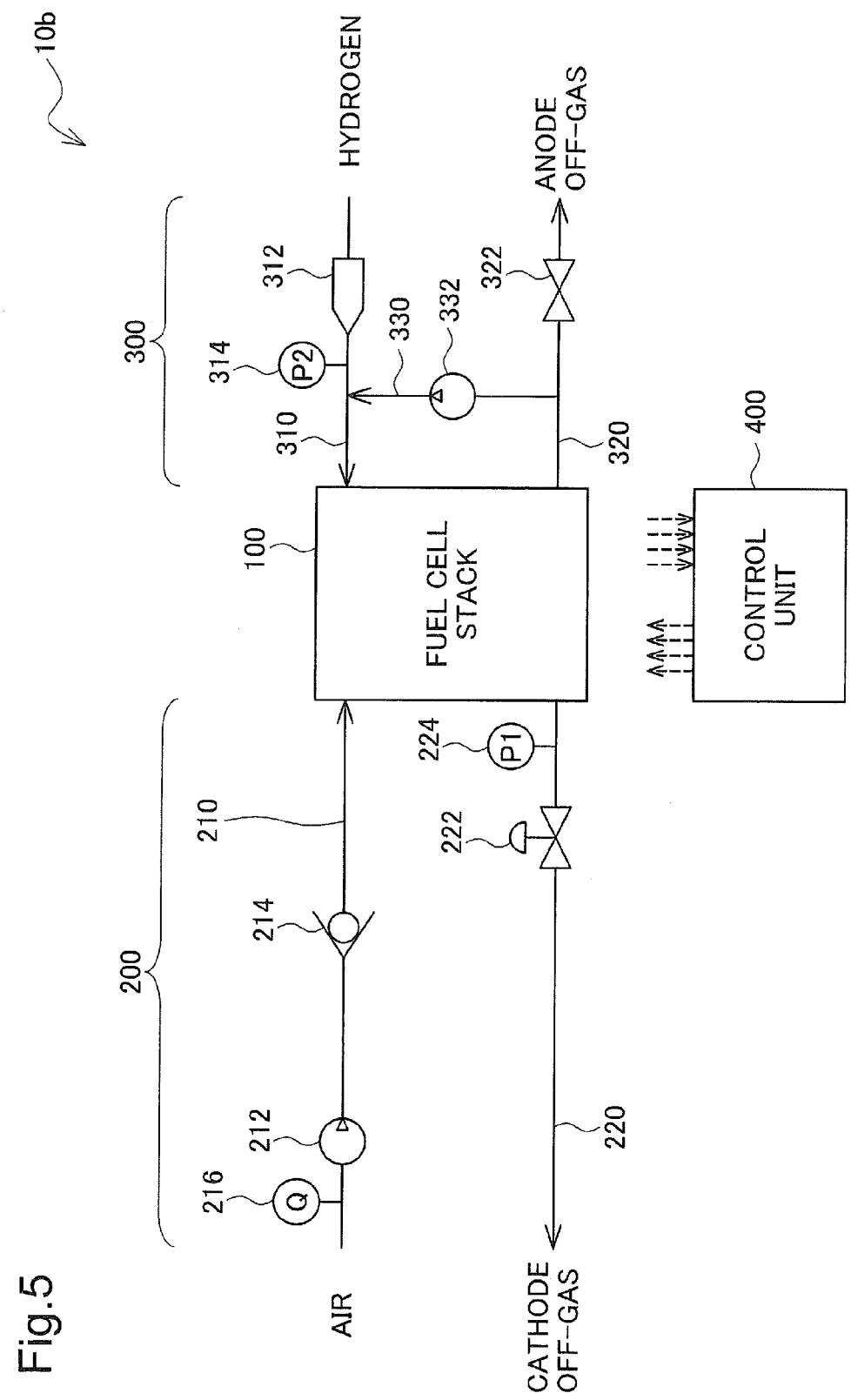
FIG. 5 is a diagram illustrating the general configuration of a fuel cell system according to a second embodiment.

FIG. 5 is a diagram illustrating the general configuration of a fuel cell system 10b according to a second embodiment of the invention. The like components in FIG. 5 to those in the fuel cell system 10 of the first embodiment shown in FIG. 1 are expressed by the like symbols. As shown in FIG. 5, the fuel cell system 10b of this embodiment is configured with omission of the bypass flow path 230 and the bypass valve 232 from the fuel cell system 10 shown in FIG. 1.

Figure 6:
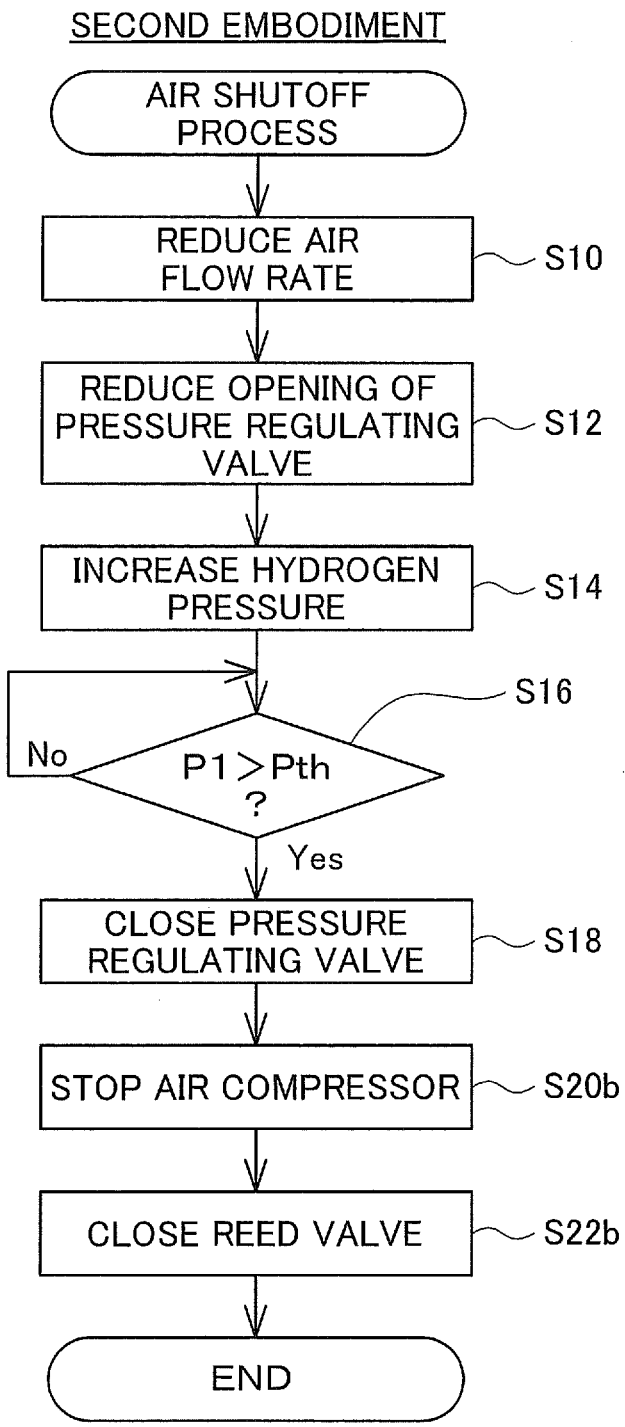
FIG. 6 is a flowchart showing an air shutoff process performed in the second embodiment.

FIG. 6 is a flowchart showing an air shutoff process performed by the control unit 400 according to the second embodiment. As shown in FIG. 6, the process performed in this embodiment differs from the air shutoff process of the first embodiment shown in FIG. 3 by the processing flow after step S18. The process of the first embodiment closes the pressure regulating valve 222 and opens the bypass valve 232 after increasing the pressure P1 of the air above the threshold value Pth, so as to close the reed valve 214. The process of the second embodiment, on the other hand, closes the pressure regulating valve 222 (step S18) and stops the air compressor 212 (step S20b) after increasing the pressure P1 of the air above the threshold value Pth, so as to close the reed valve 214 (step S22b). Similarly this processing flow can effectively close the reed valve 214 when the air of the increased pressure upstream of the pressure regulating valve 222 starts flowing reversely toward the air compressor 212 after the stoppage of the air compressor 212.

According to this embodiment, the timing of closing the pressure regulating valve 222 may be after the rotating speed of the air compressor 212 is actually decreased to or below a specified level or the flow rate Q of the air supplied by the air compressor 212 is actually decreased to or below a specified level, in response to a stop command given to the air compressor 212. This desirably prevents the pressure P1 of the air in the air supply system from being increased more than the necessary level after the pressure regulating valve 222 is closed. The specified level may be determined by experimentally measuring the rotating speed or the flow rate Q of the air that causes the pressure downstream of the reed valve 214 to reach a specific pressure level which can close the reed valve 214, when the pressure regulating valve 222 is closed after the stop command given to the air compressor 212.

The foregoing has described the invention in detail with reference to the illustrative embodiments. The invention is, however, not limited to the above embodiments, but a multiplicity of variations and modifications may be made to the embodiments without departing from the scope of the invention.

Figure 7:
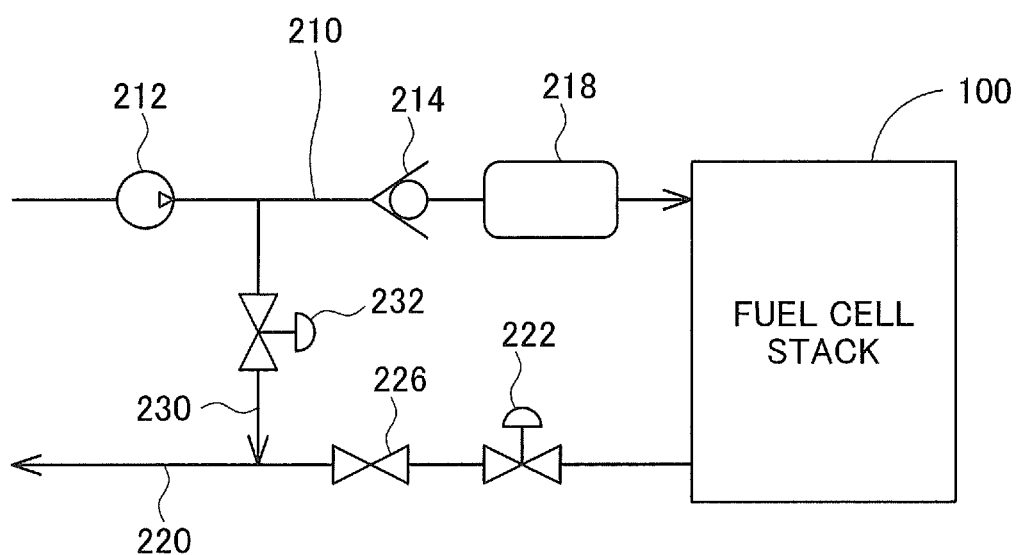
FIG. 7 is a diagram illustrating a modified configuration of the fuel cell system.

For example, as shown in FIG. 7, a buffer tank 218 having the greater flow path cross sectional area than the flow path cross sectional area of the air supply flow path 210 may additionally be provided downstream of the reed valve 214 in the air supply flow path 210, so that the air is supplied through this buffer tank 218 to the fuel cell stack 100. Providing this buffer tank 218 makes the pressure downstream of the reed valve 214 (on the side of the fuel cell stack 100) less likely to decrease even when the bypass valve 232 is fully opened (step S20 in FIG. 3) or when the air compressor 212 is stopped (step S20b in FIG. 6) in the air shutoff process of the first embodiment or the second embodiment described above. This can more effectively close the reed valve 214.

As shown in FIG. 7, a shutoff valve 226 may additionally be provided in the air exhaust flow path 220 between the pressure regulating valve 222 and the bypass flow path 230. According to this modified configuration, for example, the pressure regulating valve 222 may be used mainly to regulate the pressure, while the shutoff valve 226 may be used to open and close the air exhaust flow path 220.

REFERENCE SIGNS LIST

10,10*b* fuel cell system
100 fuel cell stack
200 air supply system
210 air supply flow path
212 air compressor
214 reed valve
215 valve body
216 air flow meter
217 joint
218 buffer tank
220 air exhaust flow path
222 pressure regulating valve
224 air pressure sensor
226 shutoff valve
230 bypass flow path
232 bypass valve
300 hydrogen supply system
310 hydrogen supply flow path
312 injector
314 hydrogen pressure sensor
320 hydrogen exhaust flow path
322 purge valve
330 circulation flow path
332 circulation pump
400 control unit

The invention claimed is:

1. A fuel cell system, comprising: a fuel cell; an air supply flow path configured to supply the air to the fuel cell; a reed valve provided in the air supply flow path and configured to be opened by a flow of the air toward the fuel cell; an air exhaust flow path configured to allow the air discharged from the fuel cell to flow therethrough; a pressure regulating valve provided in the air exhaust flow path and configured to adjust back pressure of the air supplied to the fuel cell; a bypass flow path configured to connect an upstream section of the air supply flow path upstream of the reed valve with the air exhaust flow path; a bypass valve provided in the bypass flow path and configured to open and close the bypass flow path; and a controller configured to sequentially perform a pressure-increasing process and a valve-closing process at a stoppage of the fuel cell system, wherein the pressure-increasing process reduces opening of the pressure regulating valve with supplying the air through the air supply flow path to the fuel cell in a closed position of the bypass valve, so as to increase pressure of the air upstream of the pressure regulating valve, the valve-closing process opens the bypass valve to allow a reverse flow of the air in the vicinity of the reed valve, so as to close the reed valve, the reed valve is a plate-like valve body, and with its fixed one end as a support, the other end of it deflects relative to the fixed end in response to a pressure difference between inside and outside of the valve body, and at a joint between the air supply flow path and the bypass flow path, a flow path cross sectional area of the bypass flow path is greater than a flow path cross sectional area of the air supply flow path, wherein the distance from the joint between the air supply flow path and the bypass flow path to the bypass valve is greater than the distance from the joint to the reed valve.

2. The fuel cell system according to claim 1, further comprising:
a hydrogen pressure regulator configured to regulate pressure of hydrogen supplied to the fuel cell, wherein
the controller controls the hydrogen pressure regulator to increase the pressure of hydrogen supplied to the fuel cell, in synchronism with the increase in pressure of the air during the pressure-increasing process.

3. The fuel cell system according to claim 1, wherein
the controller decreases a flow rate of the air supplied to the fuel cell during the pressure-increasing process to be lower than a flow rate of the air supplied during operation of the fuel cell system.

4. The fuel cell system according to claim 1, wherein
a joint between the air supply flow path and the bypass flow path is located proximate to the reed valve.

5. The fuel cell system according to claim 1, wherein
an inlet of the bypass flow path and an inlet of the reed valve are located to substantially face each other.

6. The fuel cell system according to claim 1, further comprising:
a buffer tank located between the reed valve and the fuel cell and configured to have a greater flow path cross sectional area than that of the air supply flow path.

\* \* \* \* \*